United States Patent
Yeung et al.

(10) Patent No.: US 7,496,645 B2
(45) Date of Patent: Feb. 24, 2009

(54) DEPLOYMENT OF BUSINESS LOGIC SOFTWARE AND DATA CONTENT ONTO NETWORK SERVERS

(75) Inventors: Wilson Yeung, Oakland, CA (US); Paul Kennedy, San Mateo, CA (US); Phillip Liu, Palo Alto, CA (US); Tony Dahbura, Centreville, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1340 days.

(21) Appl. No.: 09/978,710

(22) Filed: Oct. 18, 2001

(65) Prior Publication Data

US 2003/0078959 A1    Apr. 24, 2003

(51) Int. Cl.
    G06F 15/173    (2006.01)
(52) U.S. Cl. .................. 709/223; 709/201; 709/226; 709/248; 707/201; 707/203; 707/204
(58) Field of Classification Search ......... 709/223–226, 709/248; 707/201–204
    See application file for complete search history.

(56) References Cited

U.S. PATENT DOCUMENTS

| 5,005,122 | A | | 4/1991 | Griffin et al. | |
|---|---|---|---|---|---|
| 5,740,371 | A | * | 4/1998 | Wallis | 709/226 |
| 6,026,408 | A | * | 2/2000 | Srinivasan et al. | 709/248 |
| 6,061,740 | A | * | 5/2000 | Ferguson et al. | 709/248 |
| 6,256,712 | B1 | * | 7/2001 | Challenger et al. | 707/201 |
| 6,353,836 | B1 | * | 3/2002 | Bamford et al. | 707/203 |
| 6,405,219 | B2 | * | 6/2002 | Saether et al. | 707/201 |
| 6,466,951 | B1 | * | 10/2002 | Birkler et al. | 707/201 |
| 2001/0011265 | A1 | | 8/2001 | Cuan et al. | |
| 2002/0004824 | A1 | | 1/2002 | Cuan et al. | |
| 2002/0107072 | A1 | | 8/2002 | Giobbi | |

* cited by examiner

*Primary Examiner*—Dohm Chankong

(57) ABSTRACT

A tool for the deployment of software onto servers and other network resources provides a mechanism for parties that do not manage the operation of the servers to deploy new software. The new software is uploaded into an update directory, and a cut-over process is carried out whereby the contents of a live directory, where the currently-executing version of the software is stored, is synchronized with the update directory. Prior to this synchronization, the current state of the live directory is stored in a rollback directory. After the cut-over process, the live directory of the server becomes the source for deployment of the software to update directories in other servers. If the new version of the software is not operating to satisfaction, the information in the rollback directory is used to return the server to the prior version of the software while the new software is being revised.

53 Claims, 12 Drawing Sheets

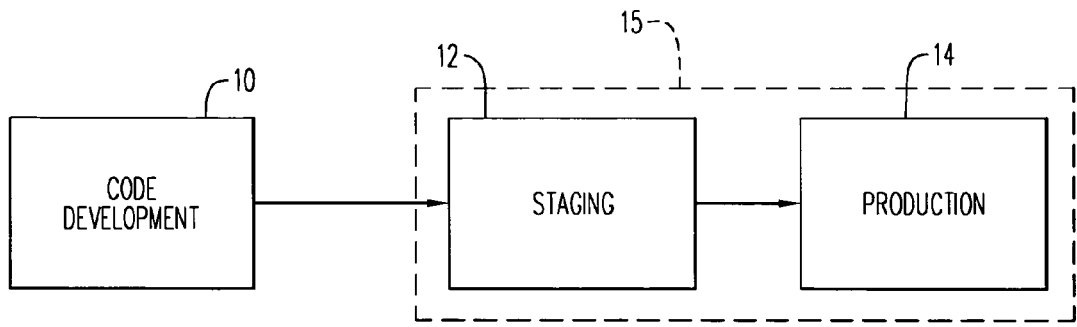
FIG. 1
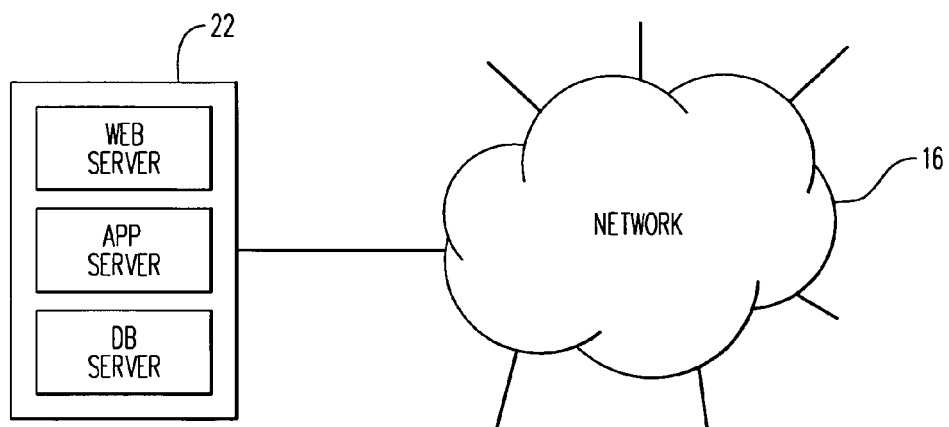
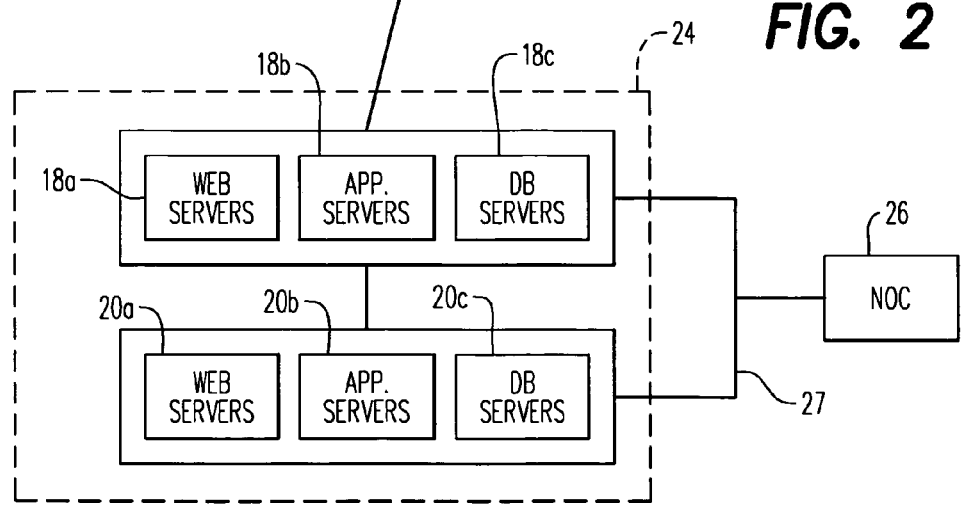
FIG. 2

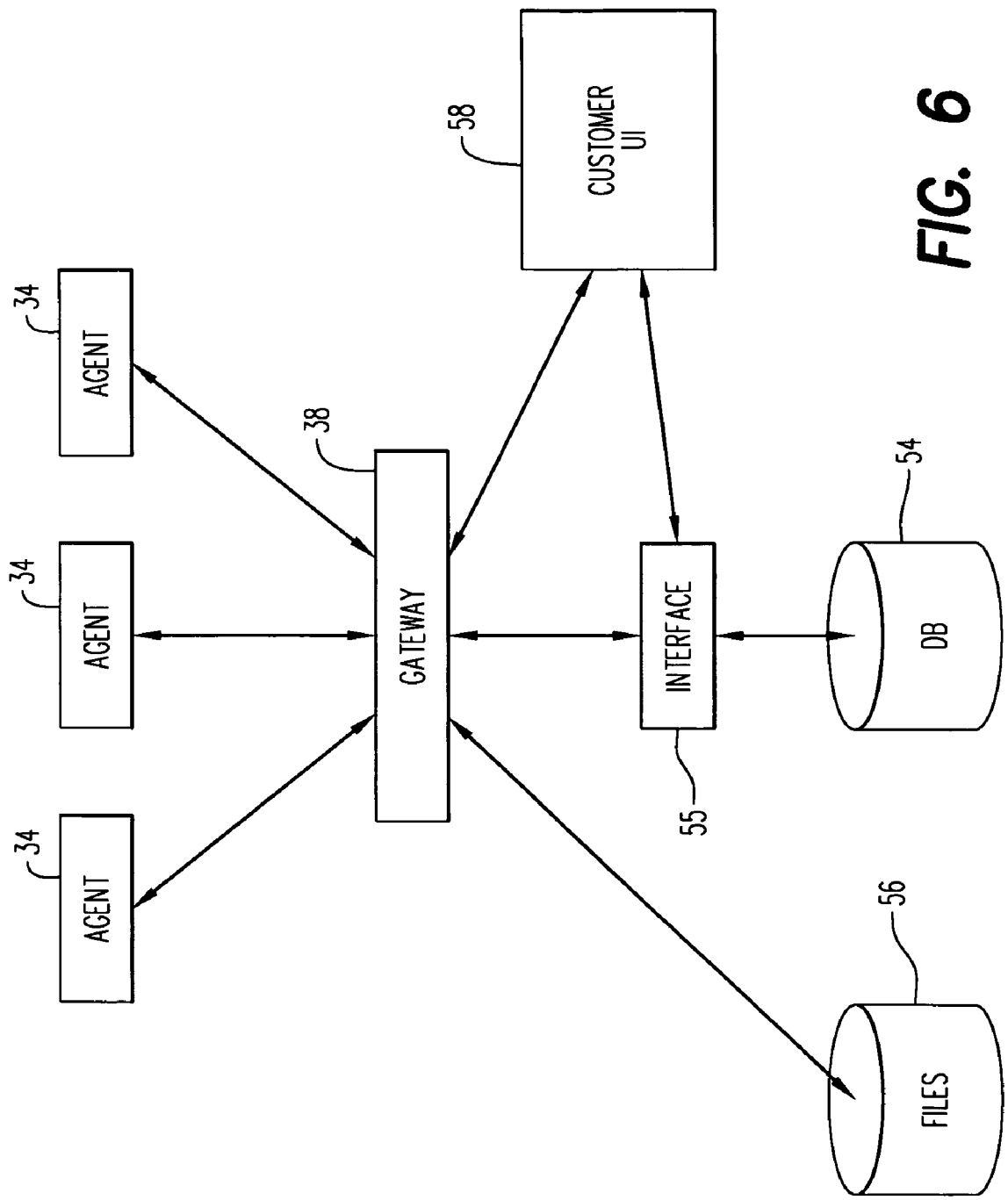

| Results for Start(Start) Operation | |
|---|---|
| Hostname | toro.snv1.corp.msp.com |
| Status | success |
| Session Id | 115230008 |

| Results | |
|---|---|
| /cust/site/bin/apachectl start: httpd/ started —— 99 | |

[Close]

*FIG. 14*

DEPLOYMENT OF BUSINESS LOGIC SOFTWARE AND DATA CONTENT ONTO NETWORK SERVERS

FIELD OF THE INVENTION

The present invention is generally directed to techniques for deploying software from a source location to a destination environment in a controlled, uniform and automated manner. More particularly, the present invention relates to systems and methods that enable hosts of Internet websites to transition the software that characterizes their sites from development into production, particularly in those environments where the operation of the website is being managed by a third party.

BACKGROUND OF THE INVENTION

In general terms, the present invention is concerned with mechanisms via which resources available on a network are updated to provide new functionality and/or content. One particularly noteworthy example of such a resource is an Internet website, where users may access information and/or conduct transactions, such as purchase goods, register for a seminar, or complete a survey. The content and functionality of the websites is embodied in bundles of software that execute on host servers that support the websites. From time to time, it may be necessary for the providers of the websites to update this software, to support new functionality and/or supply more current content. For example, a retailer may desire to update the software for its website on a weekly or monthly basis, to reflect changes in product inventory and/or prices. A newspaper may require much more frequent updates of its website's content, to ensure that the most current news is available to the users.

For some organizations that have websites, all activities associated with the website, including development, deployment and operation, are carried out within the organization, or otherwise under the organization's control. In such an environment, the organization has complete access to and understanding of all of the software that supports the website. This software can include high level graphical user interface code, the business logic code that underlies the display and document linking functionality of the website, the pages of content that are returned to users, and the application and operating system software for the servers that support the website. In such situations, the website operators are well-positioned to adapt the existing software and design and implement additional software as desired to change the appearance and/or functionality of the website.

As the e-commerce industry has continued to grow, the level of effort that is required to operate and maintain more complex and sophisticated websites has increased as well. This phenomenon has given rise to managed service providers (MSPs), wherein an organization that owns, or hosts, a website becomes a customer of the MSP, to whom it outsources the operational aspects of running the website. In such a situation, however, the development of the underlying business logic code and website content typically remains with the customer. While this out-sourcing of website operation permits organizations to focus their resources on their core business, it also creates an environment where neither the developers of the website software nor the providers of the website infrastructure and operating software can independently introduce updates to either the content or the business logic associated with the website.

To address this situation, techniques have been developed to automatically deploy software that are particularly suited for those environments in which the management of the website operations is carried out by a party other than the organization that owns the website. One example of such a technique is disclosed in copending, commonly assigned U.S. application Ser. No. 09/699,346, the content of which is incorporated herein by reference. In general, the updating of the software that supports a resource on a network, such as an Internet website, is implemented in three main stages. Referring to FIG. 1, the first stage 10 comprises a development environment, in which the software is initially written and tested. The development environment is typically under the control of the organization that owns the website. Once the appropriate software has been developed, it is installed on an intermediate level server in a staging environment 12, where it can be tested under conditions that simulate those that might be experienced once it is fully deployed. The new software is tested under those conditions and, if it proves to be satisfactory, is then moved to the final stage 14, where it is installed on one or more production servers. If the organization that owns the website employs the services of an MSP, the operation of the production servers is controlled and monitored by the MSP. Typically, the staging server is housed in the same facility as the production servers, e.g. a data center 15, and is also under the control of the MSP.

In the technique disclosed in the previously cited application, the deployment of new software for a website begins with the customer uploading the new software to a storage site associated with the staging server. This storage site may be an internal drive of the server itself, or a central storage facility that is accessible by the server. Typically, the software is uploaded in an archived format, e.g. a zip or tar file. Once the software has been uploaded, the customer sends a request to the MSP to install the software on the staging server.

To install the software, it is first converted from its archived format into one or more installable packages. Examples of installable packages include RPM packages generated by the Redhat Package Manager associated with Linux and Unix operating systems, and MSI packages associated with Microsoft operating systems. Once they have been created, the packages are installed on the staging server, where they can be executed under typical operating conditions. If the customer is satisfied that the new software is functioning properly on the staging server, a request is sent to the MSP to deploy it to the production servers. In one implementation, the newly created installation packages are stored in a network file system, in response to the request. Thereafter, the MSP retrieves the installation packages stored in the network file system, and utilizes them to install the software on each of the production servers that support the customer's website. An advantage of storing the packages in the network file system is the fact that they are later available for ready installation in the case of disaster recovery, or if there is a need to upwardly scale the site by adding more servers.

It is an objective of the present invention to improve upon this type of software deployment operation. For example, as the complexity and sophistication of websites continues to grow, the amount of software necessary to support them also grows. In some examples, the amount of software that represents the business logic of the website might be as much as 4-6 gigabytes. The amount of time required to convert this much software from an archived format into an installable package can present a considerable performance bottleneck.

Another factor associated with the conversion of the software into installable packages is that it is atomic in nature. Namely, the entire set of business logic code for a given server is contained within the packages. Hence, even if the update represents a relatively small change from a prior version, the totality of the code is converted into installable packages.

As another consideration, the need to employ the services of MSP personnel in the software deployment process can present scheduling and/or logistical constraints that can delay the time at which the new software is deployed. Hence, it is desirable to provide a mechanism in which the customer can directly deploy the software onto a staging server without requiring the assistance of MSP personnel or the need to convert the software from one format into another before installation.

SUMMARY OF THE INVENTION

In accordance with the present invention, these objectives are achieved by means of a deployment tool that provides the website owner with more direct control, and hence greater flexibility, in a deployment of software onto website servers. In the staging environment, for each type of service that is supported by the website, e.g., a web server, an application server, etc., one server is designated as a master server. The master server contains a designated update directory into which the website owner transfers updated software for the website. The transferred software is not required to be in an archived or packaged format, thereby providing the website owner with greater flexibility in its choice of tools to employ for the transfer process.

Once the updated software has been loaded onto the master staging server, a cut-over process is initiated. During this process, information about the current state of the software for the website is stored in a rollback directory. The new software in the update directory is then copied into a live directory from which the website operates. If multiple servers are employed in the staging environment for a given type of service, the deployment tool of the present invention synchronizes the software in the live directory of master server with an update directory in each of the other staging servers. The cut-over process is then carried out on each of the other staging servers. Then, the staging servers are stopped, and restarted, as necessary to cause them to execute with the updated software.

If a problem is encountered while the website is operating with the new software, a rollback to the previous version of the software can be implemented. To do so, the information stored in the rollback directory is used, to replace the updated software that was installed in the live directory. The server is then stopped and restarted, to cause it to return to the former version of the website which had been operating properly.

Once the website owner is satisfied that the updated version of the software is functioning properly on the staging servers, it is then deployed to the production servers. This deployment process is carried out in a manner similar to the deployment onto the staging servers. In particular, an update directory on each of the production servers is synchronized with the current operating directory of the master staging server. Once the synchronization has been completed, the cut-over process is effected, to cause the updated software to be installed and then executed on the production servers. Prior to synchronizing directories of the staging and/or production servers, the website owner can be provided with a manifest of the changes that will occur as part of the synchronization process. This manifest enables the website owner to confirm that the proper changes will be taking place once the synchronization and cut-over is initiated.

One of the significant advantages of the deployment tool is the fact that the synchronization and cut-over operations can be carried out totally under the control of the website owner, without requiring participation by employees of third party operators, such as an MSP. A preferred embodiment of the invention enables the website owner to initiate these operations through a web-based interface. Another component of the tool enables the website owner to solicit the assistance of third party operators at any point in the process.

The foregoing features and advantages of the invention are explained in greater detail hereinafter with reference to exemplary embodiments illustrated in the accompanying drawings.

BRIEF DESCRIPTION OF THE DRAWINGS

FIG. 1 is a block diagram of the major stages involved in updating the software for a website;

FIG. 2 is a block diagram of the components of a website that are involved in the deployment of updated software;

FIG. 6 is a block diagram of an automated provisioning system in which the code deployment tool can be integrated;

FIGS. 8-14 illustrate display screens of an exemplary user interface for the code deployment tool.

DETAILED DESCRIPTION

Figure 3:
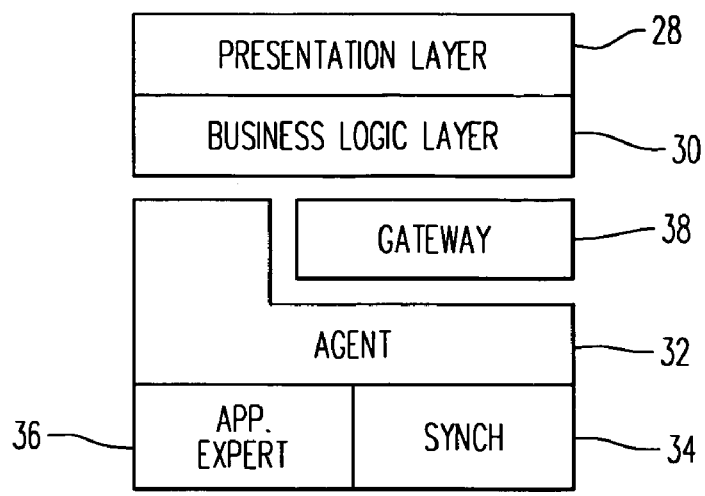
FIG. 3 is a block diagram of the architecture of an implementation of the code deployment tool of the present invention.

To facilitate an understanding of the present invention, it is described hereinafter with particular reference to an implementation in which a website owner employs the services of a third party, such as an MSP, to manage the operation of the website. While the deployment tool of the present invention is well suited for this type of environment, it will be appreciated that the practical applications of the invention are not limited thereto. Rather, the features of the invention can be utilized in an environment where the development and operation of a website are entirely under the control of a single entity as well. Further, the type of software that is deployed with the tool of the present invention is not limited to that associated with websites. In general, the principles which underlie the invention can be used to deploy any type of software from a source onto destination servers that function as resources on a network. The following description is therefore exemplary in nature, and not intended to limit the scope of the invention in any way.

The software that is associated with the operation of a website is typically classified into two types. One of the classes of software, often referred to as "code," embodies the business logic of a site and determines the functionality of that site, e.g. the types of transactions that are handled, security procedures, and the manner in which the site interacts with users. The other class of software is identified as "content," and comprises the data that is returned in response to user requests, e.g. HTML pages containing descriptions of goods, news articles, etc. Some known techniques for automatically deploying software are designed to handle content, but are not capable of automatically deploying executable code. In some cases, the code and content for a website are distinct from one another, and these known techniques are suited to the deployment of new content for such websites. However, in other cases the code and content may be so integrated that it becomes difficult to separately identify them. In these situations the known techniques cannot be employed. The deployment tool of the present invention operates independently of the particular class of software that is being deployed, and hence there is no need to distinguish between them. In the following discussion, therefore, the term "code" is employed in a generic manner to encompass both executable business logic software and content data, unless otherwise indicated.

FIG. 2 illustrates the basic infrastructure that is involved in the deployment of the software that provides the content and functionality of a network resource such as a website. The services available from a website over a network 16, such as the Internet, are provided by one or more hosts. The hosts 18 that are accessed via the network are known as production servers. A typical website may employ several different types of servers, each of which is associated with different services. For example, web servers 18a operate to handle connections with visitors to the website, and deliver static or dynamic pages of content in response to requests from the visitors. Application servers 18b perform dynamic transactions that are more computationally intensive, such as order processing, credit card verification, etc. Database servers 18c manage information that is relevant to the operation of the website, such as customer demographic and account information, available stock items, pricing, and the like. Each of these different types of servers executes application software that is specific to the services provided by them. Depending on the size of the website, a separate host, or computer, might be employed for each service, or multiple services may run on a single host.

Prior to launching or updating a website, i.e., making the content and functionality of the website available on the network 16, it is a common practice for the owner and/or operator of the website to test the software that constitutes the website in a controlled environment. For this purpose, the website support infrastructure includes staging hosts 20. A separate staging server is provided for each type of production server. Thus, if a website is comprised of web servers, application servers and database servers, the staging environment will also include at least one web server 20a, one application server 20b and one database server 20c. Often, for larger websites and/or to provide more thorough testing, multiple staging servers may be employed for one or more of the various services.

Another similar set of servers is employed at the site 22 where the software is initially developed. This development site may be on the premises of the website owner, or may be located in the facilities of a third-party vendor that provides development services. Typically, the development site can be used to detect and correct certain types of bugs and other errors that may be present in newly developed code. However, the development environment typically does not present the volume and variety of network traffic that might be experienced when the website is fully operational. For this reason, once the initial development of the code has taken place at the development site 22, it is deployed to the appropriate staging servers 20, so that it can be tested under conditions that more closely simulate the production environment, but which also offer the control necessary to quickly detect and correct a problem without adversely affecting the entire website.

In a situation in which the website owner employs the services of an MSP to operate the website, the MSP has control over the operation of the production servers 18 and, typically, the staging servers 20. For example, the production servers and the staging servers might be located within a data center 24 that houses the servers associated with the websites of a number of customers of the MSP. To enable it to monitor and control the operation of each customer's website, the MSP has a central monitoring facility 26, sometimes known as a network operation center, or NOC. Personnel at the NOC are connected to the servers that form the infrastructure of each customer's website through a secure internal network 27, and monitor the operation of those servers to detect potential and/or actual failures. In some situations, the personnel at the NOC may also have the ability to control the operation of the servers, for example to start and stop them, and/or reconfigure their settings. To maintain the integrity of operation, the number of people who are authorized to access the servers is preferably limited. Consequently, the customer may have little or no ability to configure and/or control the servers themselves.

The code deployment tool of the present invention provides a mechanism by which the customer can deploy updated software onto the servers from its development site 22, even when access to the servers may be limited. One part of the tool comprises a program that resides on each of the hosts 18 and 20 that the customer desires to be able to update. For example, if the customer desires the ability to update the functionality and/or content associated with the web servers and the application servers, the software which embodies the code deployment tool is resident on each of the hosts that function as the web servers 18a, 20a and the application servers 18b, 20b that support the customer's website.

One example of the architecture for the tool is depicted in the block diagram of FIG. 3. In one implementation of the invention, the code deployment tool operates in conjunction with agents that execute on each of the hosts for the website. These agents have root level access to the operating system software that runs on the hosts, and therefore provide authorized users with the ability to control and configure the host, including all applications running on the hosts. A detailed description of the agents and their functionality is contained in application Ser. No. 09/699,329, the content of which is incorporated herein by reference.

Referring to FIG. 3, the tool is divided into two main parts, a presentation layer 28 and a business logic layer 30. The presentation layer provides the interface via which the customer interacts with the tool. This layer accesses a list of authorized users, to provide a measure of security against inadvertent and/or improper changes to a site's code. In one embodiment of the invention, the connection to the presentation layer of the tool might be by means of a secure channel within the open network 16. Alternatively, the customer might connect to the presentation layer via a channel on the internal network 27, or via a dedicated link to its website servers. One mechanism for providing the information that identifies authorized users of the code deployment tool and authorized levels of access to the agents is described in application Ser. No. 09/841,008, the content of which is incorporated herein by reference.

The business logic layer 30 comprises a set of libraries that support the commands transmitted by the customer, to provide the functions described hereinafter. Associated with this layer are two plug-ins for the agent 32. A synchronization service 34 enables the agent to synchronize a local directory against a remote target. An application expert 36 contains information that is specific to the applications running on the host, and provides the ability to remotely control the applications. Control scripts for performing such operations can be directly provided to the agent via the business logic layer 30, or may be proxied by a gateway 38, such as the gateway described in the '329 application cited previously.

Figure 4:
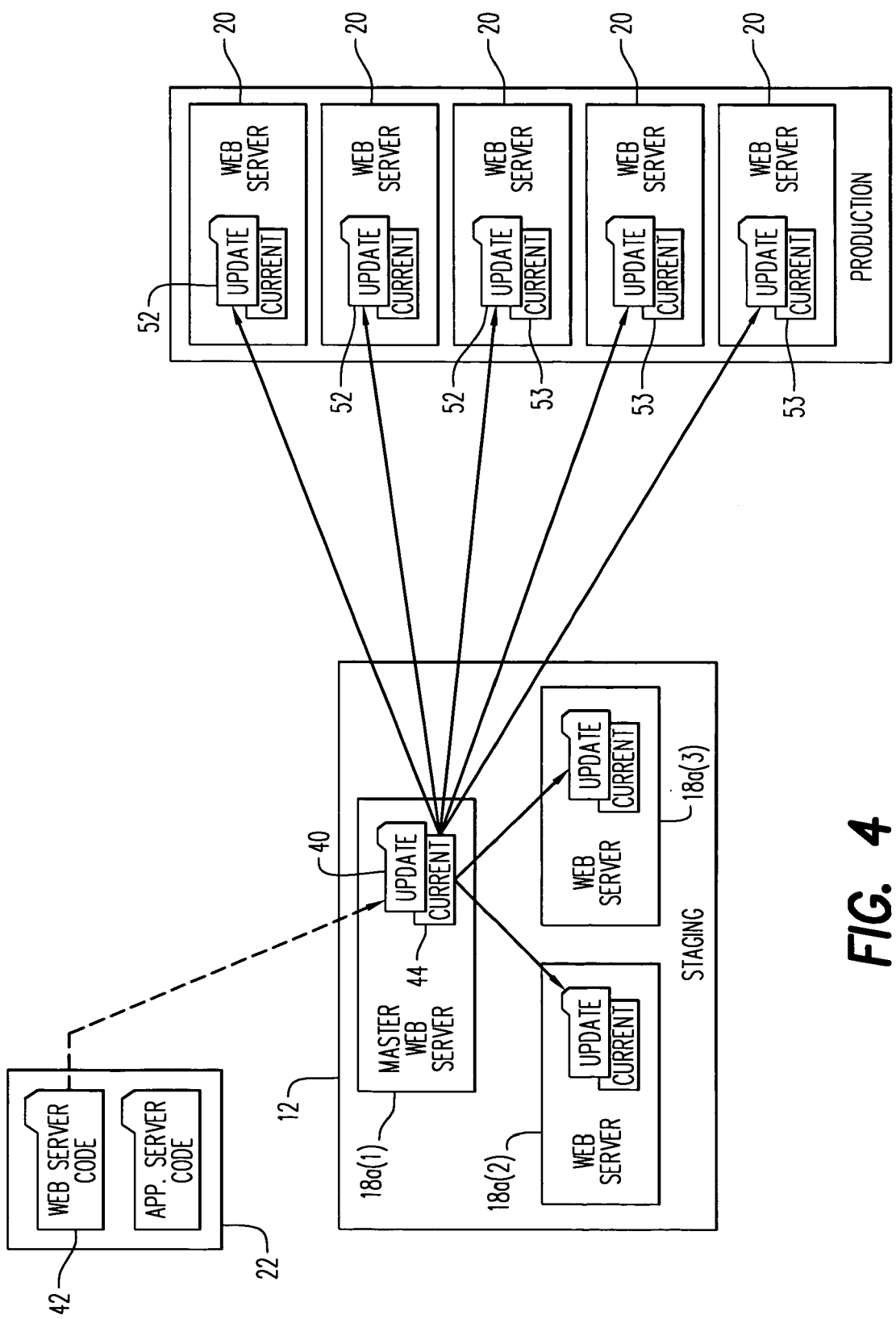
FIG. 4 is a more detailed block diagram of the infrastructure of a website that is involved in code deployment.

The procedure for the deployment of updated software in accordance with the present invention is explained with reference to FIG. 4. For ease of understanding, the following description is provided in the context of deploying new code for web servers. It will be apparent, however, that the same procedure can be used for other types of servers and devices as well. Once the code for one or more of the services associated with the website has been developed and is ready for testing, it is uploaded from the customer's development site 22 to the staging site 12. If the staging site contains only one host associated with the particular service being updated, e.g. one web server 18a, the updated software is loaded into a specified directory, designated as the update directory 40, on that host. If the staging environment comprises multiple hosts 18a(1), 18a(2), one of the hosts 18a(1) is designated as the master, and the new software is loaded into the update directory 40 of the master host. If a given host is associated with two or more services, e.g. it functions as both a web server and an application server, a separate update directory is provided for each service.

The particular manner in which the new software is loaded into the update directory 40 can be determined by the customer. For example, the customer can store the software in an archived format at its development site 22, transfer the archive file to the staging server 18a, and then expand the archive file into the update directory 40 at the staging server. Alternatively, the customer could employ the file transfer protocol (FTP) to transmit the software, on a file-by-file basis, to the update directory. In another approach, a synchronization program can be employed to compare the contents of the update directory 40 with those of a directory 42 at the development site that contains the new software, and automatically modify the contents of the update directory 40 so that it matches those of the development site. An example of such a synchronization program is the rsync algorithm, a description of which can be found in Tridgell, Andrew and Mackerras, Paul, "The rsync algorithm," Joint Computer Science Technical Report Series, TR-CS-96-05, the Australian National University, June 1996, which is incorporated herein by reference. A particular advantage associated with synchronization programs is that they only transmit the differences between a source directory and a destination directory, rather than the entirety of the code that is executed on a server. More particularly, if a first directory is to be synchronized to a second directory, those files which do not exist in the second directory are removed from the first directory as an initial step. Then, files in the second directory which are not in the first directory, or which differ from those in the first directory on the basis of select criteria, are copied to the first directory. These criteria can include the size of the file, and/or the modification date and time for the file. The files are transmitted in a streaming manner, rather than on a file-by-file basis, to thereby further expedite the transfer process. Thus, depending on the technique that is chosen, the customer has the flexibility to upload all of the files for an entire site, or only those files which need to be updated.

Figure 5:
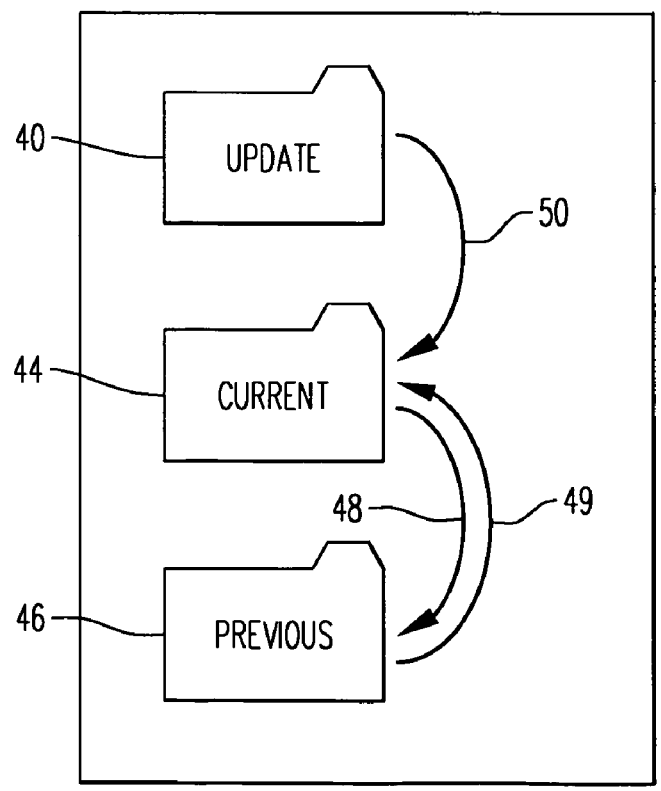
FIG. 5 is a block diagram of the directories in the staging and production servers.

Once the new version of the software is resident in the update directory of the master staging host, a cut-over process is initiated to cause the software to be installed and executed on the server. Referring to FIG. 5, each server has three storage directories associated with the website owner's code. The update directory 40 constitutes the storage area into which a newly developed version of the code is loaded, as described previously. A current, or "live", directory 44 contains the version of the software from which the currently executing code is retrieved. A previous directory 46 contains information about the version of the software that was executed immediately prior to the current version.

The cut-over process involves two major steps. First, the previous directory 46 is synchronized to the current directory 44 (as depicted by the arrow 48), so that information about the currently running version of the software is stored in the previous directory 46. To do so, the synchronization service 34 on the host determines the differences between the files in the update directory 40 and the current directory 44. In operation, the synchronization service prepares a digest of each file that is in the two directories to be synchronized. The digest can comprise information regarding attributes such as the size, last modification date and time, and ownership rights associated with the file. The synchronization service then compares the digests for the respective directories. For example, a given code update might involve the modification of two existing files, the addition of one new file, and the deletion of a file in the previous version. Comparison of the digests reveals these differences in the two directories. The synchronization service stores a log file in the previous directory 46 which identifies the four files that are being affected by the update, as well as the nature of the change, i.e. new, modified or deleted. It also determines whether the current versions of the file being deleted and the two files being modified are stored in the previous directory, and if not it copies them into the directory. The list of changes can also be provided to the customer, to verify that the proper action will be occurring during the cut-over process.

Once the information is stored in the previous directory 46 in this manner to reflect the changes that will occur in the current directory 44, the current directory is then synchronized to the update directory 40 (as depicted by the arrow 50), to cause the new version of the software to be loaded into it. In the case of the prior example, therefore, one file is deleted from the current directory, one new file is added, and two files are overwritten with the modified versions. If necessary, the code deployment tool can then issue a command to restart the server, via the application expert 36, to cause the server to load and execute the new version of the software stored in the current directory.

After the new code has been loaded into the current directory 44 on the master staging server 18a(1), the customer has the option to deploy the code to other staging servers of the same type. The customer can instruct the synchronization service on the master host to synchronize update directories on the other staging hosts 18a(2), 18a(3) with the contents of the current directory 44 on the master staging host 18a(1). After the customer has designated each of the destination servers to be synchronized, the synchronization service 34 on each of the destination servers prepares and forwards a digest of the files in its current directory to the synchronization service 34 on the master host. In response, the master host determines the differences between its current operating directory and that of each other staging hosts, and sends all changes to the other hosts, where they are placed in the update directory 40 for that host. The cut-over process is then carried out on each of the other staging hosts, so that the new version of the software is resident in their current directories 44.

Once the cut-over processes have been effected, the staging servers execute the new version of the software, to enable it to be tested before it is implemented on the entire website. The testing that is carried out by the staging servers can be accomplished in various ways. In one implementation, the staging servers may be located on a special test network that is accessible by a limited group of users, who then provide feedback on the operation and content of the new version of the site. Alternatively, the staging servers might be connected to the same network 16 as the production servers. In this case, load balancers (not shown) associated with the production servers might divert a limited amount of the website traffic to the staging servers. Hence, some of the visitors to the website may encounter servers running one version of the software (the current version), whereas other visitors encounter the updated version. Personnel at the NOC and/or the customer's premises can monitor the staging servers, to determine whether the updated version of the software is operating properly under these conditions.

If the new version of the software failed to install properly when the staging servers were restarted, or if faulty operation is encountered once the servers begin to execute the software, the customer can initiate a rollback operation. In this operation, the contents of the current directory 44 are synchronized to the previous directory, i.e., the previous directory 46 becomes the source and the current directory is the destination for the synchronization, as indicated by the arrow 49. In this process, the log file stored in the previous directory 46 is used to restore the contents of the current directory to its prior state. Referring again to the prior example, the added file is deleted from the current directory 44, the two modified files are overwritten with their prior versions stored in the previous directory 46, and the deleted file is copied back into the current directory. If necessary, the server is then restarted, to resume operation under the prior version of the code. The updated version of the code can then be debugged at the development site, after which the upload, synchronization and cut-over processes are repeated.

Once the customer is satisfied that the new version of the software is functioning properly, the code deployment tool can be employed to promote this software onto the production hosts. Referring to FIG. 4, in a manner analogous to the operations that occurred in the staging hosts 18, update directories 52 on the production hosts 20 are directly synchronized to a directory on the master staging host 18 which contains the updated version of the code. In the embodiment illustrated in FIG. 4, the current directory 44 on the master host is used as the source for the synchronization. In the illustrated case, the synchronization service 34 on each production host sends a digest of the files in its current directory 53 to the master staging host 18. The master staging host prepares a manifest of the differences between its current directory 44 and the current directory 53 on the production host 20. If desired, this manifest of the changes that will occur on each production host can again be transmitted to the customer, to provide verification that the changes that will take place are, in fact, correct. If the changes appear to be appropriate, the customer can transmit a command to proceed with the synchronization process. In response, the code deployment tool causes the changes listed in the manifest to be made in the update directory 52 of the production server. This process is carried out for each production host that provides a service of the same type as the master staging server, e.g. all of the web servers in the production environment. Again, by directly transferring the software updates from the master staging server to the production servers, without requiring intermediate file storage or involvement of third-party personnel, the deployment process is made more efficient.

After the update directories of the production servers have been modified in accordance with the manifest, the cut-over process is effected. As in the case of the staging servers, this process involves the synchronization of the previous directories to the current directories, followed by the synchronization of the current directories to the update directories.

As a further feature of the invention, the code deployment tool provides the customer with the ability to perform additional services prior to initiation of execution with the new software. For example, when the new software was developed, it may have been configured with parameters that were specific to the staging servers. Once it has been loaded into the current directories of the production servers, the software may need to be reconfigured with the parameters appropriate to the individual servers. For example, symbolic links to files may need to be reset. To do so, therefore, the code deployment tool can support functions by which the customer can stop the current operation of the server, configure the software as necessary, and start the server again, to execute the newly loaded software. To configure a server, the code deployment tool can execute one or more scripts that are stored in the server or at another accessible location. These scripts cause the appropriate parameters within the software to be configured for the specifics of the server in which they are loaded. Such configuration operations can be carried out before or after any of the other operations that have been described, e.g. synchronization, cut-over, rollback, etc.

In one implementation of the invention, the code deployment tool can be integrated with a system for automatically provisioning and managing servers on a network. One example of such a system is disclosed in the previously cited '329application. The manner in which the code deployment tool cooperates with the server management system is illustrated in FIG. 6. An agent 32 runs on each of the host computers in the staging and production environments that are controlled by the management system. The synchronization service 34 on each host operates under the control of the agent. For example, the synchronization services on different hosts communicate with each other via ports assigned to the agents. The communications to and from the agents take place through the gateway 38.

As described in greater detail in the '329 application, information pertaining to each of the hosts that are associated with the management system is stored in a central database 54. One example of the structure of such a database and types of information that can be stored therein is described in application Ser. No. 09/699,353, the content of which is incorporated herein by reference. Such information includes an identification of each host computer that supports a given customer's website, the service(s) which execute on each host, personnel who are authorized to access each communication port on the host, etc. In connection with the code deployment tool, the database 54 stores definitions pertaining to the operations that can be performed on each host. For example, one customer of an MSP might be given authorization to perform synchronization and cut-over operations on all of the hosts that support its website, whereas another customer may be able to directly perform these operations on the staging hosts, but not on the production hosts. In such a case, only NOC personnel might be given the ability to implement the synchronization and/or cut-over operations. Other parameters can be stored as part of the definition as well, such as whether the manifest of changes is to be provided to the customer for verification prior to a cut-over operation. Data is stored into and retrieved from the database 54 by means of an interface 55 that constructs all of the appropriate query and command statements in response to requests received from authorized users.

The operations that are performed within the code deployment tool generally fall into two categories, synchronization and service management. The latter category involves operations that occur within a single host, such as cut-over, rollback, and others described hereinafter. Synchronization, on the other hand, involves multiple hosts. Each of these two categories of operations can be carried out by a respective script that is stored in a central file system 56.

Figure 7:
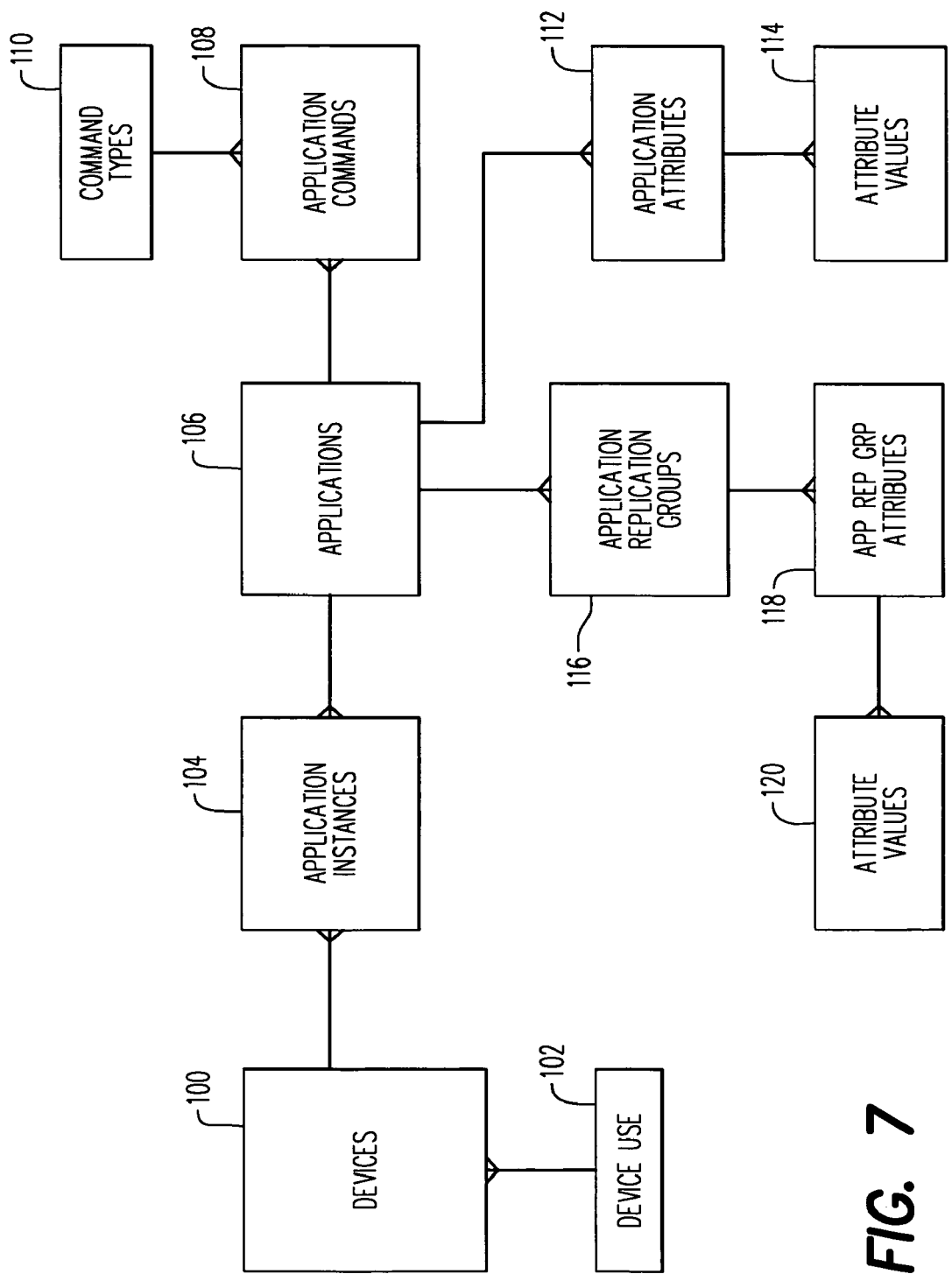
FIG. 7 is a block diagram of the database schema for storing synchronization and service definitions.

An exemplary schema that can be employed in the database 54 to store the definitions for the operations is depicted in FIG. 7. A table 100 contains information about each device, e.g. host, that is contained within the management system. Such information may include a name by which the device is identified, its IP address, operating system, etc. A use table 102 provides information about the particular use of that device, e.g. staging, production, quality assurance, etc. An application instances table 104 indicates each instance of a service running on a device, e.g. web server, application server, database server. An applications table 106 contains information about the specific type of service and the name of the particular application providing that service, e.g. WebLogic, Apache, etc. This table also identifies the particular account, or customer website, with whom that application is associated. An application commands table 108 and a command type table 110 provide information regarding synchronization commands, pre-operation commands, and post-operation commands that can be employed with each application.

The application table 106 is associated with the definition of service operations for a host. A table 112 contains the attributes that pertain to an application, and a table 114 provides the values for those attributes. Included in those attributes are information which indicates the authorized users and access levels for running service operations on the application, by means of the code deployment tool.

The definitions for synchronization operations are associated with an application replication groups table 116. This table also has a corresponding attributes table 118 and an attribute values table 120. The attributes in these tables describe the different application instances that can be synchronized to one another, as well as the authorized users and levels of authorization for performing synchronization.

When a customer desires to perform an operation with the code deployment tool, the provisioning system is accessed via a designated user interface channel 58. This channel may be, for instance, a secure Internet site associated with the system. Once the system has been accessed, the customer interacts with the user interface to cause a command to be sent to perform an operation, e.g. initiate a cut-over, along with the arguments appropriate to that command, i.e. the identification of the host and/or service on which the operation is to take place. This command is transmitted to the gateway 38, which retrieves the appropriate script from the file system 56. The gateway then sends commands from the script to the agent 34 running on the host where the operation is to occur, inserting information from the arguments, as required. In essence, the gateway 38 operates as a state machine that initiates the desired operation and monitors its status. For instance, each line of the script can be sent to the agent as a command, which is carried out by the synchronization service 34 or the application expert 36. When the agent returns a response, the next line of the script is sent as appropriate. If a response is not returned within a designated period of time, the gateway can send an error signal to the NOC 26 and/or the customer via the user interface 58. Status information maintained in the gateway during the operation provides an audit trail for error checking purposes, and can be stored in the central database 54 upon each event that occurs.

When a cut-over operation takes place, the agent 34 on the host can be instructed to archive all of the constituent files for that operation, i.e. the modified and added files, for storage in the file system 56. In one implementation of the invention, the archived files can be transmitted from the agent to the gateway, to be stored in the file system. Alternatively, if the system includes a tool that automatically reconciles the status of a server, e.g. its constituent software and configurations, with the information in the database, the agent can directly provide the archived files to this tool. Along with the archiving of the files, the log file of the changes is stored in the database 54. By storing the changes in this manner, the latest version of the code for a host is available in the event of disaster recovery or the need to upwardly scale a site by adding more servers of a given type. The option whether to automatically perform this storage operation can be another item of information that is contained within the service definitions in the database 54.

Figure 8:
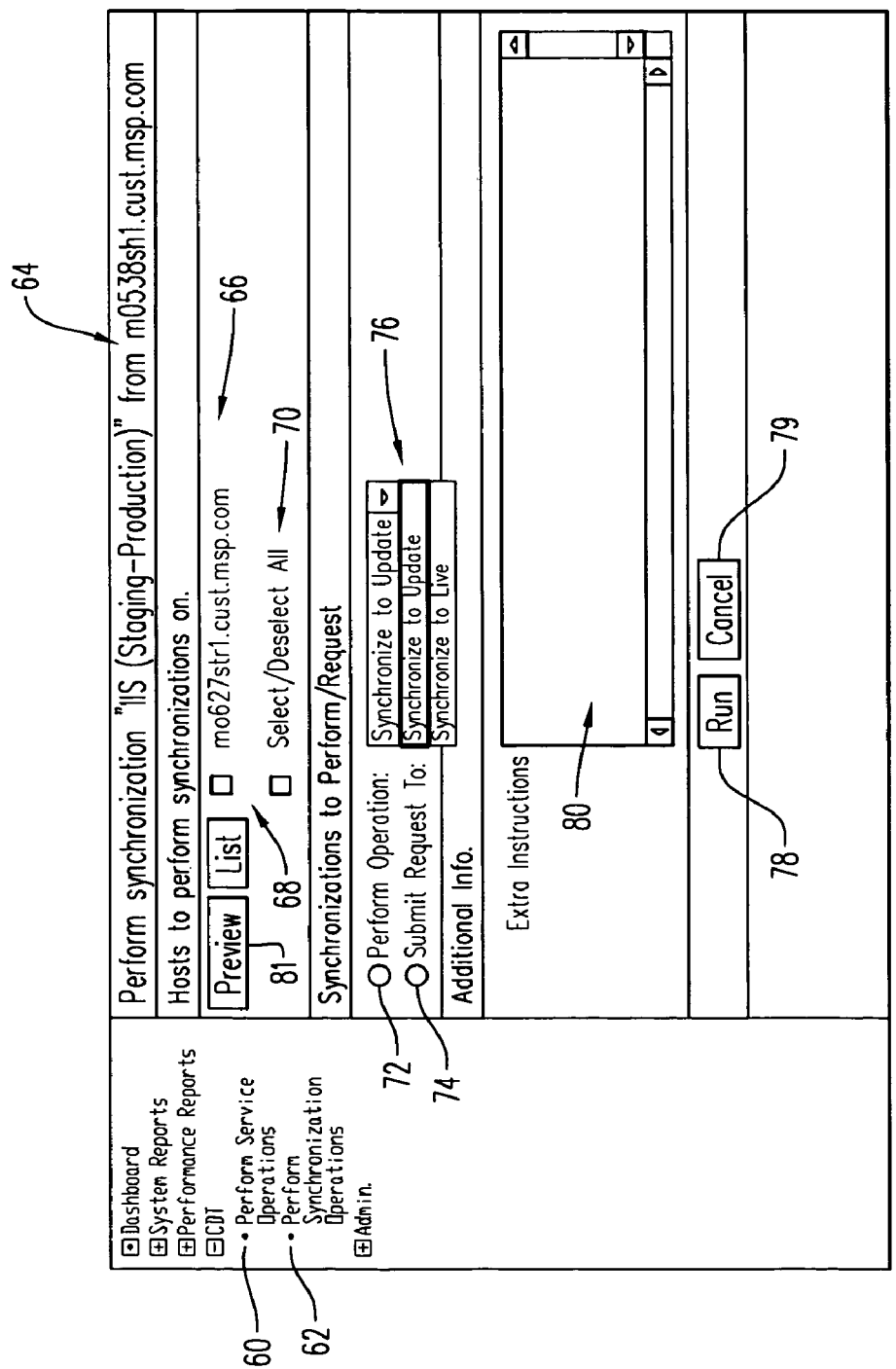

As described previously, the code deployment tool can be a web-based application which the user accesses via a secure channel 58 on the network 16. FIGS. 8-14 illustrate examples of an interface that can be presented to authorized employees of the customer via the secure channel to utilize the functions of the tool. FIG. 8 depicts the initial screen that is presented to the user when logging into the tool. On the left side, the user is presented with two options relating to the tool, under the heading "CDT", namely Perform Service Operations 60 and Perform Synchronization Operations 62. As noted previously, each of these two categories of operations has an associated script stored in the file system 56.

To deploy the new software from the master staging server to other destination servers, the user selects option 62. As a result of this selection, the right window pane identifies the master staging host 64 from which the synchronization will occur, and a list 66 of the other hosts which can be synchronized to the master. In the illustrated example, only one other host is displayed in the list. The identifications of the available hosts for a given customer are obtained from the information stored in the database 54. The code deployment tool accesses this database, for instance via the interface 55, to obtain the identifications of the hosts that are appropriate to a given operation. Thus, for example, if the master server identified at 64 is a web server, the list 66 would only contain the identification of other web servers belonging to the customer's site, and not application servers, database servers, and the like. If a new web server host is added to the website, information about that host is added to the database as part of the standard operation of the provisioning system. Thereafter, the host would automatically appear in the list 66 of FIG. 8 whenever the user accesses that screen, and relieves the customer of the need to be aware of and manually identify the new host. From the displayed list, the customer can select the particular servers that are to be synchronized, by checking a box 68. The customer also has the option to select or deselect all displayed hosts by means of a check box 70.

After the destination hosts have been designated, the user has the option to directly initiate automatic synchronization by selecting a button 72, or send a request to another entity, e.g., the NOC 26, to carry out the operation, by selecting a button 74. If the synchronization definition for the customer that is stored in the database 54 indicates that the customer does not have the privilege level necessary to directly perform the synchronization, the button 72 is not displayed, so that it cannot be selected. A menu 76 is displayed which enables the user to designate whether the synchronization should be made on the update directory or the current (live) directory of the destination hosts. Typically, the new code will be loaded into the update directories, as described previously. In some cases, however, it may be preferable to synchronize directly to the current directory when the software being updated is not likely to have an impact on the stability of the website, e.g., static content. In these cases, the update directory and the cut-over process can be bypassed, to expedite the deployment of the new software.

After the appropriate options have been selected, a "Run" button 78 is activated, to initiate the synchronization process. If the user elects to submit a request to another entity to run the process by clicking the button 74, additional instructions can be entered in a text window 80. Under this option, clicking the Run button 78 causes the information in the screen to be transmitted to the NOC 26, where the synchronization process can be controlled and monitored.

Prior to clicking the Run button 78, the user can elect to view the list of changes that will be made during the synchronization process. This is accomplished by clicking on a Preview button 81. This action causes a new window to be displayed. If the user is satisfied that the proper changes will take place, the window is closed to return to the display of FIG. 8, whereupon the Run button 78 can be selected. If the changes in the list are not correct, the operation can be canceled by clicking on the button 79, and appropriate corrective action can be taken.

Figure 9:
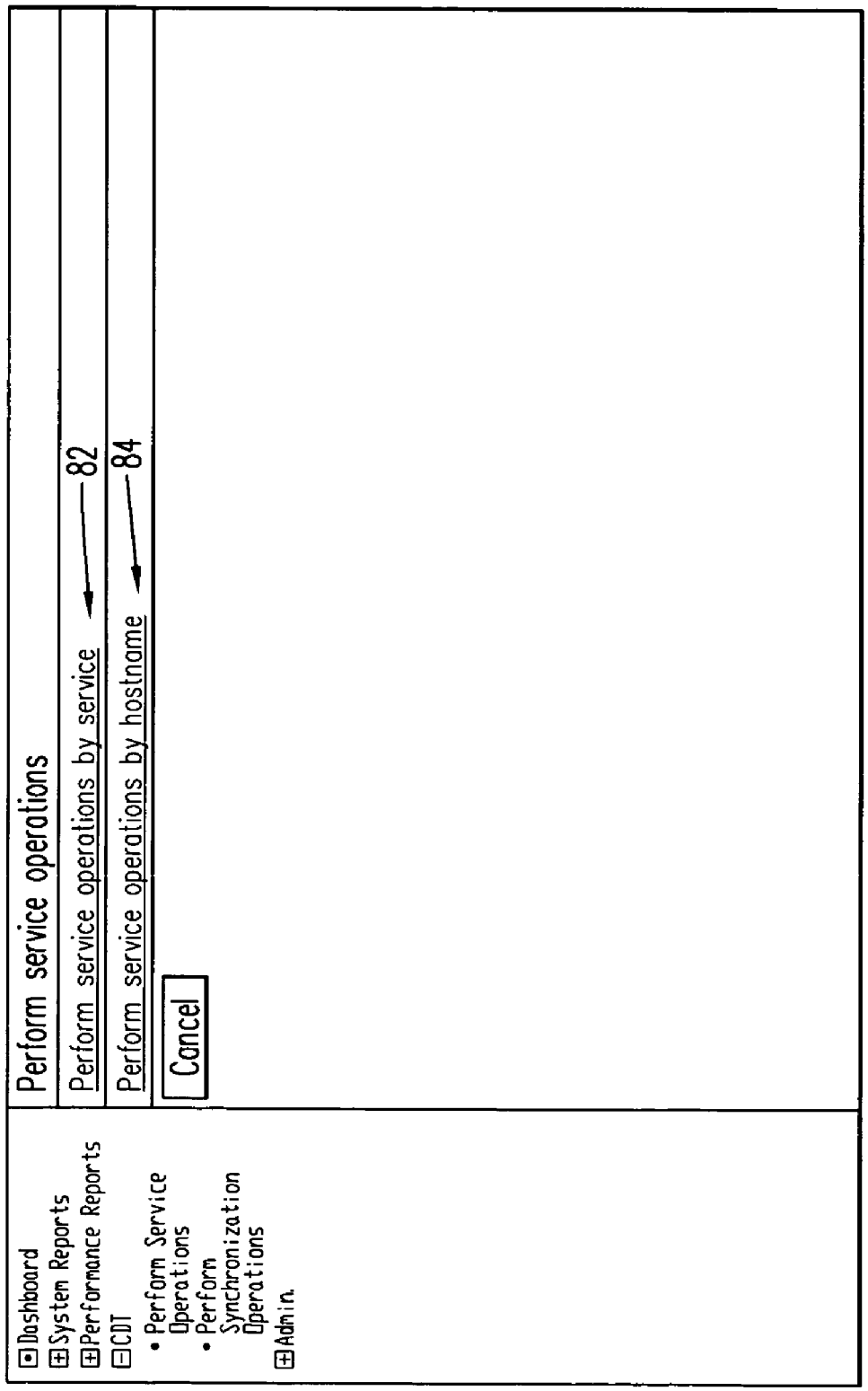
Figure 10:
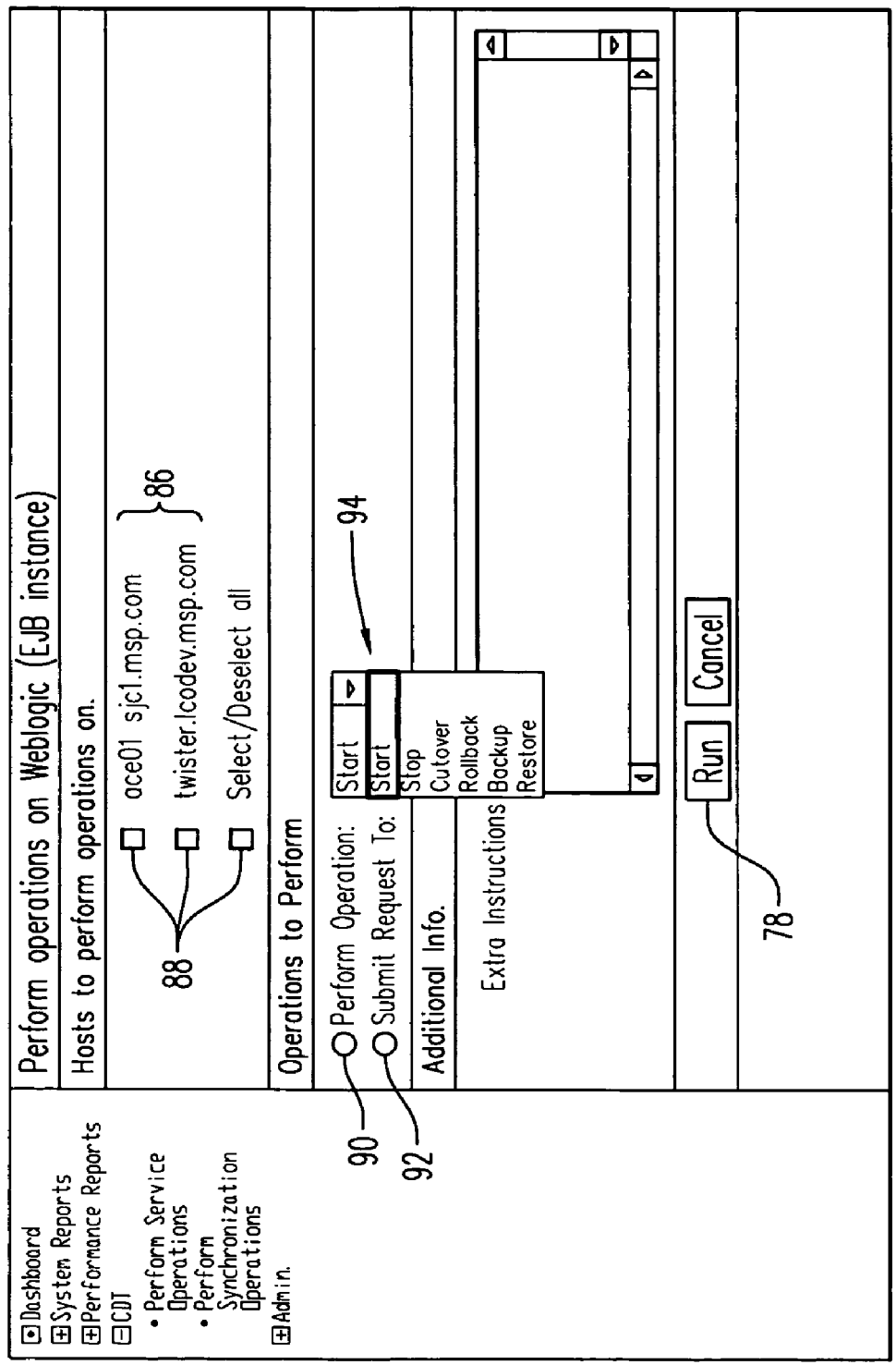

The other option 60 in the interface enables the user to perform various types of operations on the servers. If this option is selected, a page such as that shown in FIG. 9 is displayed. This page provides the user with two additional options, to perform the operations by the type of service 82, or to perform the operation by designating the hosts, or servers, 84. If the first option 82 is selected, the user interface displays a list of the available services on the website, e.g. a web server, an application server, etc. Since there may be different species within each type, it may be preferable to list the services by reference to the particular application program that is providing the service, e.g. WebLogic for an application server, or Apache for a web server. When the user selects a particular service, the hosts associated with that service are displayed, as illustrated in FIG. 10. In this particular example, a list 86 of two hosts is displayed for the WebLogic service. The user can select either or both of these hosts, via the checkboxes 88.

Once the hosts have been designated, the user can choose to directly perform an operation by clicking on the button 90, if the user has the necessary privilege, or send a request to another to carry out the operation, via the button 92. If the user is not so privileged, the button 90 is not displayed. A drop-down menu 94 displays the operations that can be performed by the tool, via the application expert 36. These operations include the ability to launch a defined service, e.g. start a web server instance on a host, and to shut down a defined service instance, for example before cutting over to new software on a server. Each time one of these service operations is performed, the gateway writes an entry in a log file, and sends an alert to the NOC 26. Hence, personnel at the NOC will be aware of the reason that a service has suddenly started or stopped. The user also has the ability to back up the software by saving the entire contents of the current directory in a backup directory. The backup directory is different from the previous directory 46 on a host, in that the previous directory only stores information regarding the changes from one version of the code to the next, whereas the backup directory stores a complete copy of the code in the current directory. A restore operation copies the contents of the backup directory to the current directory for the host. After selecting one of the operations, the user clicks the Run button 78 to initiate the operation or send a request to the NOC.

Figure 11:
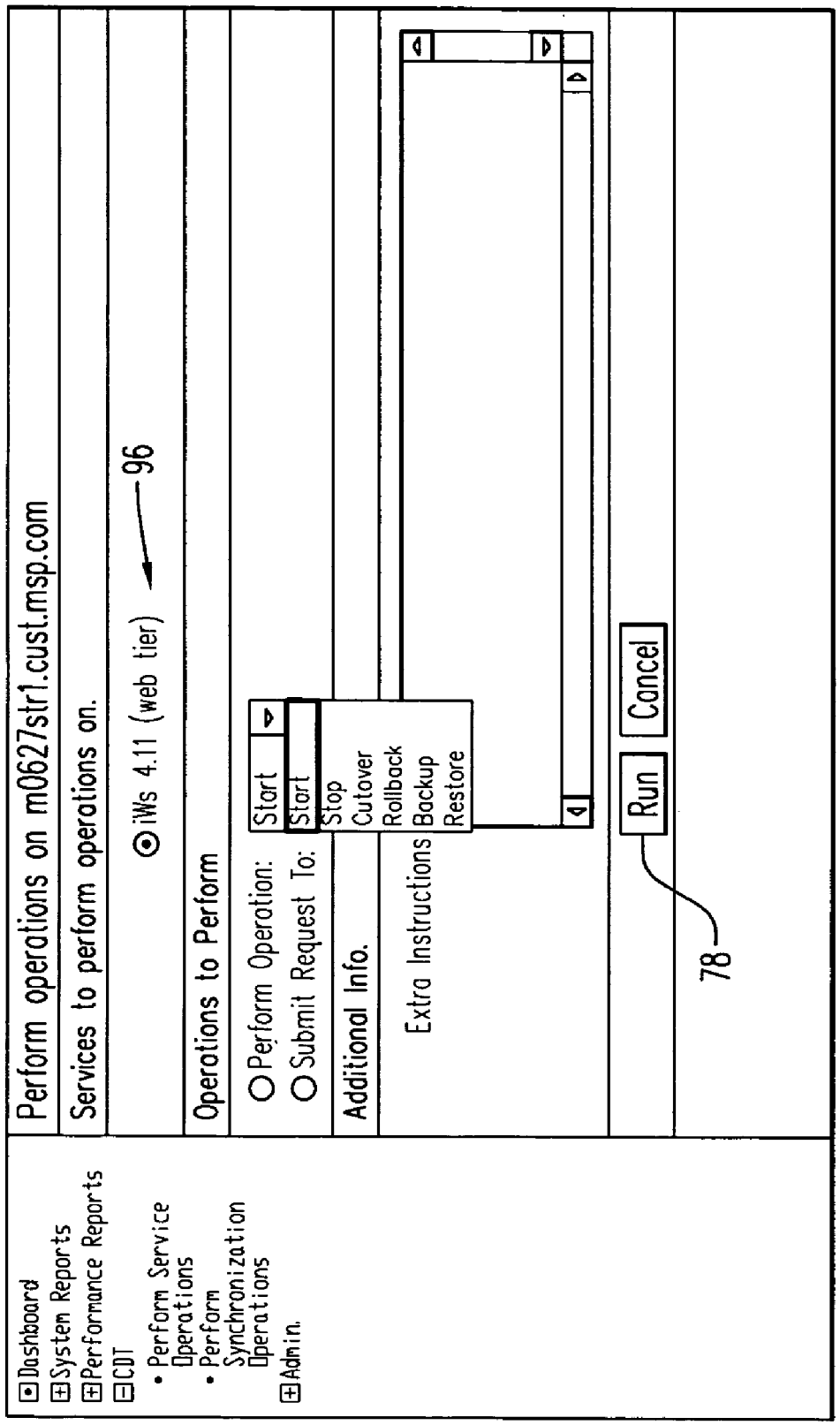

If the user chooses option 84 to perform an operation by host name, a list of the staging and production hosts 18 and 20 is obtained from the database 54 and displayed. Upon selecting a particular host, the page illustrated in FIG. 11 is presented to the user. This page displays a list 96 of the services available on that host for which the operation can be performed. Again, this information is retrieved from the database 54. In the illustrated example, only one service (a web server) is available. The desired service is selected, and then the user indicates the operation to be performed, in the same manner as explained in connection with FIG. 10.

Figure 12:
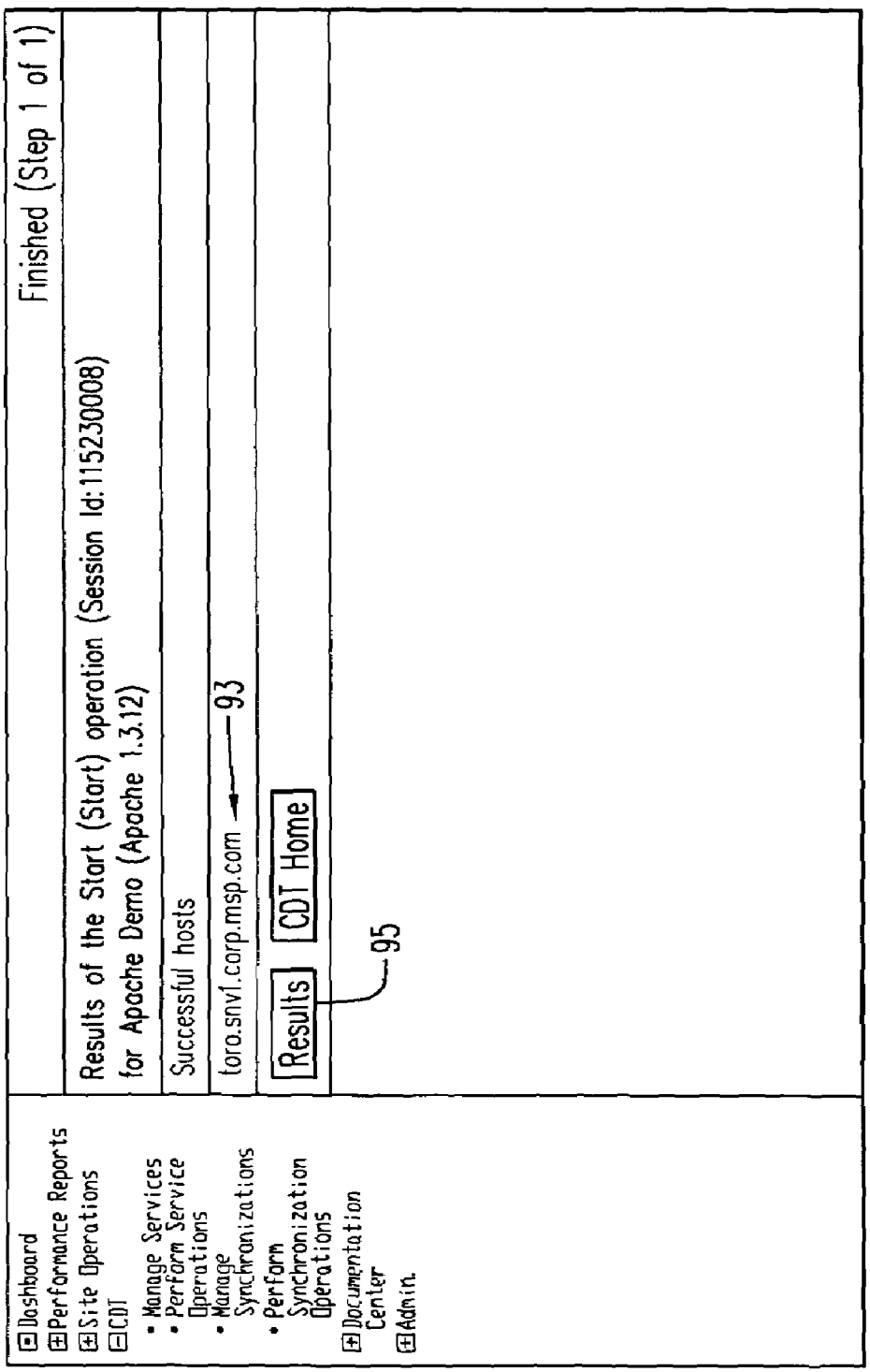
Figure 13:
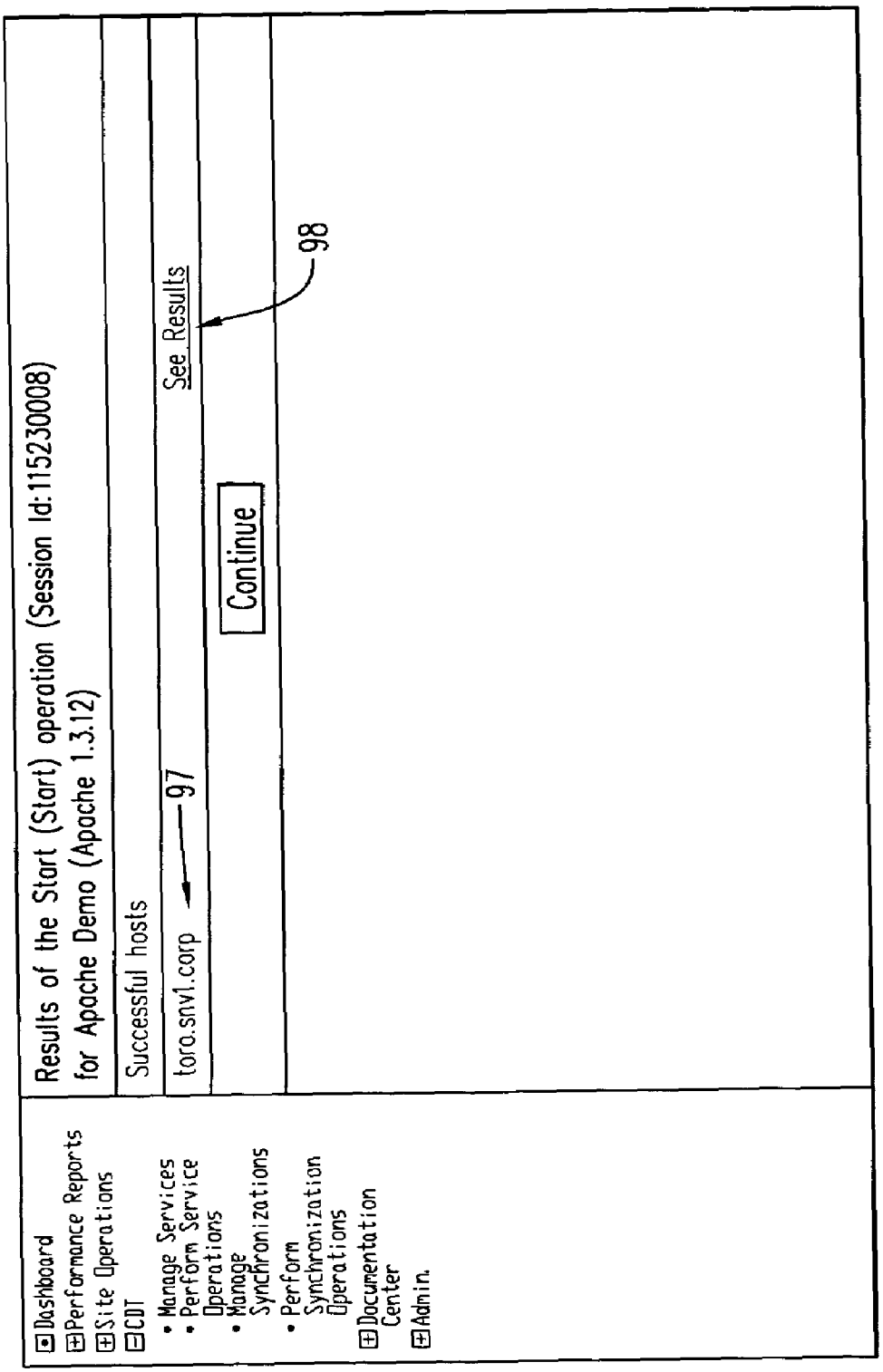

After an operation has been completed, the results are displayed to the user. FIG. 12 illustrates an example of a first window that is displayed, in this case regarding a start operation performed on an Apache web server. Only one host 93 was involved in this operation, which is listed under the heading of successful hosts. If the operation had failed on this server, or any other selected servers, they would be grouped under a separate heading to that effect.

At the bottom of the list of hosts appears a "Results" command button 95. Clicking on this button causes the window of FIG. 13 to be displayed. This window presents a link 97 to each host that was involved in the operation, so that the user can explore detailed results of the operation on a host-by-host basis. To do so, the user clicks on a "See Results" button 98 adjacent the host of interest. This action causes the window of FIG. 14 to be displayed. This window presents the actual output 99 from the script that was run to perform the operation, in this case the Apache web server start script.

From the foregoing, therefore, it can be seen that the present invention provides a tool for efficiently deploying updated software from a development environment to the staging and production servers of a network resource, such as a website. Among the advantages offered by the tool is the fact that much, if not all, of the deployment process can be conducted by an authorized person who does not have control over the operation of the servers themselves, such as a website owner who has outsourced the management of the servers to a third party. The features of the invention which support this capability further function to enhance the flexibility and the efficiency of the deployment process.

It will be appreciated by those of skill in the art that the present invention can be embodied in other forms without departing from the spirit or essential characteristics thereof. For example, while disclosed in the context of a website that is managed by a third party, the features of the invention can be employed with any type of network resource whose underlying software may require updating from time to time. In particular, the development of the software and the operation of the resource could all occur within the confines of a single organization, in which case the tool of the present invention can be employed by designated personnel within the organization.

Further, while an exemplary embodiment of the invention has been described in the context of deploying code to staging hosts and then production hosts, it can be seen that the principles which underlie the invention can be employed to deploy code onto any type of host that functions as a resource on a network, such as a quality assurance server or the like.

Likewise, in the foregoing embodiments, examples have been described in which the customer initiates the processes for all of the servers involved in deployment. In some cases, however, it may be preferable to limit the particular servers on which the customer can utilize the tool without oversight from the MSP or other organization, to thereby minimize adverse operations. For instance, the privileges may be set up so that the customer can initiate synchronization and cut-over on the staging servers, but must request personnel at the NOC to perform these services on the production servers. This may be accomplished, for example, by means of the definition stored in the database 54 for each server, so that the customer is only provided with an identification of staging servers in the lists 66 and 86, and therefore does not have the ability to synchronize to the production servers. Alternatively, all of the servers may be displayed in the lists, but the options to directly perform operations, associated with the buttons 72 and/or 90, may not be displayed or operational if the user does not have the appropriate access rights.

The presently disclosed embodiments are therefore considered in all respects to be illustrative, and not restrictive. The scope of the invention is indicated by the following claims, rather than the foregoing description, and all changes that come within the meaning and range of equivalents thereof are intended to be embraced therein.

What is claimed is:

1. A method for deploying software associated with a resource on a network, comprising the steps of:
    storing a copy of the software in a first designated directory on an intermediate server;
    synchronizing the contents of a second designated directory on said intermediate server to said first designated directory;
    executing an application on said intermediate server in accordance with the software in said second designated directory;
    synchronizing the contents of a predetermined directory on a destination server to said second designated directory; and
    executing an application on said destination server in accordance with the software in said predetermined directory.

2. The method of claim 1 wherein a plurality of intermediate servers are present, and wherein said copy of the software is stored in the first designated directory in a master intermediate server, and further including the step of synchronizing a first designated directory in each of the other intermediate servers to the second designated directory of the master intermediate server.

3. The method of claim 1 wherein the step of synchronizing the contents of the second designated directory includes the step of synchronizing the contents of a third designated directory to said second designated directory prior to synchronizing said second designated directory to said first designated directory.

4. The method of claim 3 further including the step of rolling back the contents of said third designated directory to said second designated directory in response to a malfunction in the execution of the application after the second designated directory has been synchronized to said first designated directory.

5. The method of claim 3 wherein said third designated directory contains information which identifies files that are added to said second designated directory and files in said second designated directory that are modified when said second designated directory is synchronized to said first designated directory.

6. The method of claim 5 wherein said information contained in said third designated directory also identifies files that are being deleted from said second designated directory.

7. The method of claim 6 wherein said third designated directory also contains a copy of the files that are being deleted.

8. The method of claim 7 wherein said rollback step includes copying the files that were deleted from said third designated directory to said second designated directory.

9. The method of claim 5 wherein said third designated directory also contains a copy of an unmodified version of the files that are being modified.

10. The method of claim 9 wherein said rollback step includes copying said unmodified versions of the files from said third designated directory to said second designated directory.

11. The method of claim 1 wherein the step of synchronizing the contents of the predetermined directory on the destination server comprises the steps of:
    synchronizing the contents of an update directory on said destination server to said second designated directory on said intermediate server; and
    synchronizing the contents of said predetermined directory to said update directory.

12. The method of claim 1 further including the step of generating a manifest of differences between said predetermined directory on the destination server and the second designated directory on said intermediate server prior to synchronizing said predetermined directory.

13. The method of claim 12 further including the step of storing the differences listed on said manifest in a storage system separate from said intermediate server and said destination server.

14. The method of claim 1 wherein said synchronizing steps comprise the steps of determining the differences between first and second directories to be synchronized, and transmitting only those files which differ between the two directories from the first directory to the second directory.

15. The method of claim 14 wherein said synchronizing steps further include the optional step of deleting files from the second directory which are not present in the first directory.

16. The method of claim 14 wherein the step of determining differences comprises the step of preparing a digest of each file in each of said first and second directories, and comparing the digests of the two directories to one another.

17. The method of claim 16 wherein a digest contains information regarding attributes of each file, including its size and last modification date.

18. A method for deploying software associated with a resource on a network, comprising the steps of:
    storing information in a database that identifies one or more hosts associated with the resource;
    receiving a request to update software for said resource;
    retrieving said information from said database and displaying hosts which are available for updating;
    receiving a designation of at least one of the displayed hosts;
    determining differences between software currently executing on the designated host and an updated version of the software;
    storing information relating to said differences in said database;
    updating the software on the designated host; and
    storing a script file containing commands that define an operation to be performed, and wherein said step of updating the software includes the following steps:
        retrieving said script file in response to designation of an operation to be performed;
        forwarding said commands to the designated host; and
        executing said commands on the host.

19. The method of claim 18 wherein said script file is stored in a file system and said commands are executed by an agent that is running on said host, and wherein said script file is retrieved by a gateway that receives said designations and forwards said commands to said agent for execution.

20. The method of claim 19 wherein said gateway further carries out the steps of monitoring the status of execution of said commands, and storing information regarding said status in said database.

21. The method of claim 18 wherein said script file contains commands that relate to service operations that are performed on a host.

22. The method of claim 21 wherein one of said service operations comprises a cut-over operation that includes the steps of synchronizing files in a first directory on the host with those in a second directory on the host, and causing the host to execute the files in said second directory.

23. The method of claim 22 wherein said cut-over operation further includes the step of synchronizing files in said second directory with those in a third directory, and another one of said service operations comprises a rollback operation that includes the steps of synchronizing files in said third directory with those in said second directory, and causing said host to execute the files in said second directory.

24. The method of claim 21 wherein said service operations include the stopping and starting of the operation of the host.

25. The method of claim 18 wherein said script file contains commands that relate to the synchronization of two directories on two respective hosts.

26. The method of claim 25 wherein one of the hosts comprises a source and contains a directory that stores a current version of the software that executes on that host, and the other host comprises a destination that contains a first directory that stores a current version of the software that executes on that host and a second, update directory, and wherein the synchronization comprises the steps of:
    comparing the contents of the first directory in the destination host with the current directory in the source host and determining differences in their contents; and
    storing said differences in the update directory in the destination host.

27. A method for deploying software associated with a resource on a network, comprising the steps of:
    storing information in a database that identifies one or more hosts associated with the resource;
    storing a script file that contains commands relating to the synchronization of two directories;
    receiving a request to update software for said resource;
    retrieving said information from said database and displaying hosts which are available for updating;
    receiving a designation of at least one of the displayed hosts;
    running said script file to determine differences between a directory on the designated host and a source directory;
    transmitting files that correspond to said differences from said source directory to said host; and
    storing a second script file containing commands that relate to service operations that are performed on a designated host;
    wherein one of said service operations comprises a cut-over operation that includes the steps of synchronizing files in a first directory on the host with those in a second directory on the host, and causing the host to execute the tiles in said second directory.

28. The method of claim 27 wherein said script file is stored in a file system and said commands are executed by an agent that is running on said host, and wherein said script file is retrieved by a gateway that receives said designations and forwards said commands to said agent for execution.

29. The method of claim 28 wherein said gateway further carries out the steps of monitoring the status of execution of said commands, and storing information regarding said status in said database.

30. The method of claim 27 wherein said source directory is located on a source host and stores a current version of software that executes on the source host, and said designated host contains a first version of software that executes on said designated host and a second, update directory, and wherein the synchronization comprises the steps of:
    comparing the contents of the first directory in the destination host with the current directory in the source host and determining differences in their contents; and
    storing said differences in the update directory in the destination host.

31. The method of claim 27 wherein said cut-over operation further includes the step of synchronizing files in said second directory with those in a third directory, and another one of said service operations comprises a rollback operation that includes the steps of synchronizing files in said third directory with those in said second directory, and causing said host to execute the files in said second directory.

32. The method of claim 27 wherein said service operations include the stopping and starting of the operation of the host.

33. A system for deploying software onto a network resource, comprising:
    a database containing information that identifies one or more hosts associated with the resource;
    a user interface via which a user can transmit requests to perform operations associated with the deployment of software;
    a storage system that stores script files containing commands that pertain to said operations; and
    a gateway that is responsive to a request from said user interface to retrieve said information and cause said user interface to display hosts which are available for updating, and is responsive to the designation of at least one displayed host to retrieve a script file associated with a requested operation and send commands from said script file to the designated host to perform the requested operation;
    wherein one of said script files contains commands that relate to service operations that are performed on a host;
    wherein one of said service operations comprises a cut-over operation in which files in a first directory on the host are synchronized with those in a second directory on the host, and wherein the host executes the files in said second directory.

34. The system of claim 33 wherein said commands are executed by an agent that is resident on the designated host.

35. The system of claim 33 wherein files in said second directory are synchronized with those in a third directory, and another one of said service operations comprises a rollback operation in which files in said third directory are synchronized with those in said second directory, and the host executes the files in said second directory.

36. The system of claim 33 wherein said service operations include the stopping and starting of the operation of the host.

37. The system of claim 33 wherein said script file contains commands that relate to the synchronization of two directories on two respective hosts.

38. The system of claim 37 wherein one of the hosts comprises a source and contains a directory that stores a current version of the software that executes on that host, and the other host comprises a destination that contains a first directory that stores a current version of the software that executes on that host and a second, update directory, and wherein the synchronization compares the contents of the first directory in the destination host with the directory in the source host and determines differences in their contents, and stores said differences in the update directory in the destination host.

39. A method for deploying software associated with a resource on a network, comprising the steps of:
   storing a copy of the software in a predetermined directory on an source server;
   executing an application on said source server in accordance with the software in said predetermined directory;
   synchronizing the contents of a fxst designated directory on a destination server to said predetermined directory;
   synchronizing the contents of a second designated directory on said destination server to said first designated directory; and
   executing an application on said destination server in accordance with the software in said second designated directory.

40. The method of claim 39 wherein the step of synchronizing the contents of the second designated directory includes the step of synchronizing the contents of a third designated directory to said second designated directory prior to synchronizing said second designated directory to said first designated directory.

41. The method of claim 40 further including the step of rolling back the contents of said third designated directory to said second designated directory in response to a malfunction in the execution of the application after the second designated directory has been synchronized to said first designated directory.

42. The method of claim 41 wherein said third designated directory contains information which identifies files that are added to said second designated directory and files in said second designated directory that are modified when said second designated directory is synchronized to said first designated directory.

43. The method of claim 41 wherein said information contained in said third designated directory also identifies files that are being deleted from said second designated directory.

44. The method of claim 42 wherein said third designated directory also contains a copy of the files that are being deleted.

45. The method of claim 43 wherein said rollback step includes copying the files that were deleted from said third designated directory to said second designated directory.

46. The method of claim 41 wherein said third designated directory also contains a copy of an unmodified version of the files that are being modified.

47. The method of claim 46 wherein said rollback step includes copying said unmodified versions of the files from said third designated directory to said second designated directory.

48. The method of claim 39 further including the step of generating a manifest of differences between said second designated directory on the destination server and the predetermined directory on said source server prior to synchronizing said first designated directory.

49. The method of claim 48 further including the step of storing the differences listed on said manifest in a storage system separate from said source server and said destination server.

50. The method of claim 39 wherein said synchronizing steps comprise the steps of determining the differences between first and second directories to be synchronized, and transmitting only those files which differ between the two directories from the first directory to the second directory.

51. The method of claim 50 wherein said synchronizing steps further include the optional step of deleting files from the second directory which are not present in the first directory.

52. The method of claim 50 wherein the step of determining differences comprises the step of preparing a digest of each file in each of said first and second directories, and comparing the digests of the two directories to one another.

53. The method of claim 52 wherein a digest contains information regarding attributes of each file, including its size and last modification date.

* * * * *

UNITED STATES PATENT AND TRADEMARK OFFICE
CERTIFICATE OF CORRECTION

PATENT NO. : 7,496,645 B2  
APPLICATION NO. : 09/978710  
DATED : February 24, 2009  
INVENTOR(S) : Wilson Yeung et al.

Page 1 of 1

It is certified that error appears in the above-identified patent and that said Letters Patent is hereby corrected as shown below:

In column 17, line 62, in Claim 27, delete "tiles" and insert -- files --, therefor.

In column 19, line 12, in Claim 39, delete "fxst" and insert -- first --, therefor.

Signed and Sealed this

Eleventh Day of August, 2009

David J. Kappos
*Director of the United States Patent and Trademark Office*